US009138708B2

(12) United States Patent
Plummer et al.

(10) Patent No.: US 9,138,708 B2
(45) Date of Patent: Sep. 22, 2015

(54) SYSTEM AND METHOD FOR REMOVING RESIDUAL GAS FROM A GASIFICATION SYSTEM

(71) Applicant: General Electric Company, Schenectady, NY (US)

(72) Inventors: Mae Alane Plummer, Humble, TX (US); Anindra Mazumdar, Katy, TX (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 13/678,537

(22) Filed: Nov. 15, 2012

(65) Prior Publication Data

US 2014/0134055 A1    May 15, 2014

(51) Int. Cl.
*B01J 7/00*        (2006.01)
*C01B 3/36*        (2006.01)

(52) U.S. Cl.
CPC .. *B01J 7/00* (2013.01); *Y02E 20/16* (2013.01); *Y02E 20/18* (2013.01)

(58) Field of Classification Search
CPC .................................. C01J 3/723; C01J 3/728
See application file for complete search history.

(56) References Cited

U.S. PATENT DOCUMENTS

| 5,984,985 | A * | 11/1999 | Malone | 48/25 |
|---|---|---|---|---|
| 2002/0195589 | A1 * | 12/2002 | Russ et al. | 252/373 |
| 2005/0256592 | A1 * | 11/2005 | Martens | 700/21 |
| 2006/0112639 | A1 * | 6/2006 | Nick et al. | 48/198.1 |
| 2009/0202403 | A1 * | 8/2009 | Jimenez-Huyke et al. | 422/198 |
| 2011/0020145 | A1 * | 1/2011 | Katagiri et al. | 417/54 |
| 2011/0132902 | A1 * | 6/2011 | Novak | 219/687 |
| 2012/0006200 | A1 | 1/2012 | Mazumdar et al. | |
| 2012/0017562 | A1 | 1/2012 | Mazumdar et al. | |
| 2012/0131853 | A1 | 5/2012 | Thacker et al. | |
| 2012/0266966 | A1 * | 10/2012 | Kretschmer et al. | 137/1 |
| 2013/0048085 | A1 * | 2/2013 | Tyree et al. | 137/1 |
| 2013/0192137 | A1 * | 8/2013 | Stevenson et al. | 48/61 |
| 2013/0269251 | A1 * | 10/2013 | Tyree et al. | 48/61 |
| 2014/0001406 | A1 * | 1/2014 | Kar et al. | 252/372 |

* cited by examiner

*Primary Examiner* — Imran Akram
(74) *Attorney, Agent, or Firm* — Fletcher Yoder P.C.

(57) ABSTRACT

A method includes monitoring a pressure of a gasification system after gasifier shutdown via a pressure sensor, wherein the gasification system includes a gas treatment system and a gasifier configured to output syngas to the gas treatment system during gasification. In addition, the method includes depressurizing the gasification system after gasifier shutdown by opening a flare valve to release gas from the gasifier and the gas treatment system to an atmosphere. The method also includes pressurizing the gasification system after gasifier shutdown, when the monitored pressure reaches a lower pressure threshold, by establishing multiple purge flows of inert gas into the gasification system to remove residual gas from the gasification system. The multiple purge flows are established at different times and at different locations within the gasification system relative to each other.

17 Claims, 8 Drawing Sheets

SYSTEM AND METHOD FOR REMOVING RESIDUAL GAS FROM A GASIFICATION SYSTEM

BACKGROUND OF THE INVENTION

The subject matter disclosed herein relates to systems and methods for removing residual gases from a gasification system.

Integrated gasification combined cycle (IGCC) power plants are capable of generating energy from various carbonaceous feedstock, such as coal or natural gas, relatively cleanly and efficiently. Such IGCC power plants generally include a gasification system, used to convert the carbonaceous feedstock into a gas mixture of carbon monoxide (CO) and hydrogen ($H_2$), i.e., syngas, by reaction with oxygen and steam in a gasifier. Unfortunately, existing IGCC systems may be ineffective at removing residual gases from gasification system components after the gasifier is shut down. For example, existing gasification systems may not remove the gases quickly enough to enable a hot restart of the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes monitoring a pressure of a gasification system after gasifier shutdown via a pressure sensor, wherein the gasification system includes a gas treatment system and a gasifier configured to output syngas to the gas treatment system during gasification. In addition, the method includes depressurizing the gasification system after gasifier shutdown by opening a flare valve to release gas from the gasifier and the gas treatment system to an atmosphere. The method also includes pressurizing the gasification system after gasifier shutdown, when the monitored pressure reaches a lower pressure threshold, by establishing multiple purge flows of inert gas into the gasification system to remove residual gas from the gasification system. The multiple purge flows are established at different times and at different locations within the gasification system relative to each other.

In a second embodiment, a gasification system includes a gasifier, a gas treatment system, a pressure sensor, and a flare valve. The gasifier is configured to generate a syngas during gasification. The gas treatment system is configured to receive the generated syngas from the gasifier for treating the syngas during gasification. The pressure sensor is configured to monitor a pressure of the gasification system, and the flare valve is configured to release residual gases from the gasification system to the atmosphere when it is opened to depressurize the gasification system after gasifier shutdown. The gasification system also includes multiple flow lines configured to facilitate a flow of the residual gases through the gasification system as the gasification system is depressurized and subsequently pressurized after gasifier shutdown. A gas flow is established through each of the flow lines at different times relative to one another after gasifier shutdown, based at least in part on the monitored pressure.

In a third embodiment, a tangible, non-transitory, computer-readable medium includes machine-readable instructions to obtain data relating to a pressure of a gasification system from a pressure sensor of the gasification system. The tangible, non-transitory, computer-readable medium also includes machine-readable instructions to control operation of a flare valve to reduce the pressure of the gasification system when opened and to allow residual gases to flow out of the gasification system after gasifier shutdown. Further, the tangible, non-transitory, computer-readable medium includes machine-readable instructions to control operation of two or more valves to provide separate flows of inert gas into the gasification system after gasifier shutdown to increase the pressure of the gasification system upon the pressure of the gasification system reaching a lower pressure threshold. The separate flows are established at different times relative to each other.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
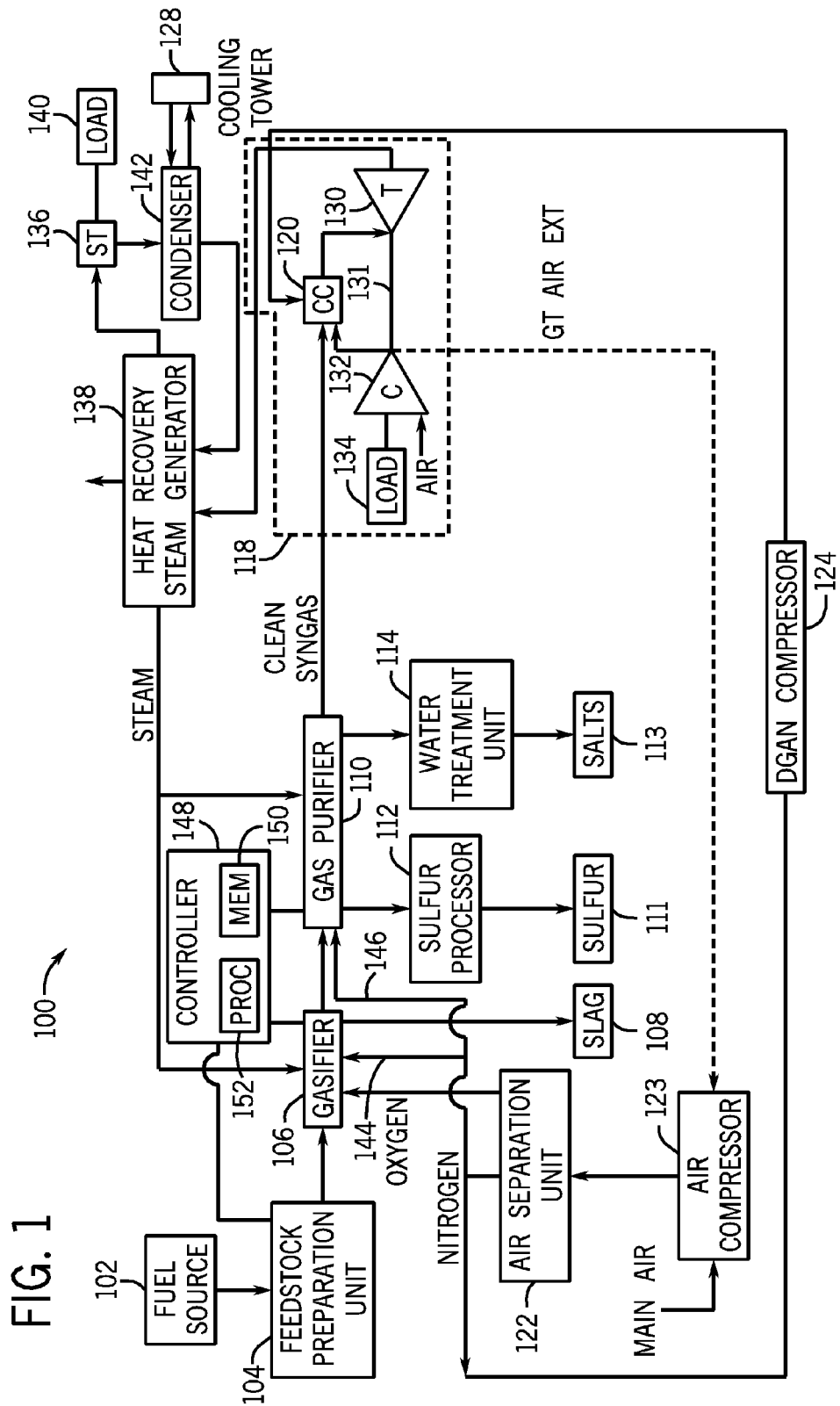
FIG. 1 is a block diagram of an embodiment of an integrated gasification combined cycle (IGCC) power plant incorporating multiple purge flow lines for removing residual gases from a gasifier.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are directed to a system and method for removing residual gases (e.g., syngas, acid gases, oxygen, etc.) from a gasification system after gasifier shutdown through a sequence of depressurizing and pressurizing the gasification system. The gasification system may be equipped with multiple flow lines and features that allow for a quicker depressurization/pressurization cycle after gasifier shutdown. Depressurization occurs via the opening of a flare valve, which vents concentrations of pollutants and combustible gases out of the gasification system. The system may include a bypass flow line that may be opened during depressurization (e.g., to bypass certain gas treatment equipment) to allow a higher flow rate of gases from the system and, therefore, a faster depressurization. In addition, the gasification system may include multiple flow lines for introducing an inert purge (e.g., nitrogen) gas into the system, thereby pressurizing the system. The multiple flow lines each introduce the inert purge gas to different locations of the gasification system and at different times relative to one another. This may allow the system to maintain a forward flow of residual gases through the gasification system during pressurization after gasifier shutdown. Because of the multiple purge flows, pressurization of the system occurs faster than would be possible with a single purge flow. In addition, the gasification system may provide a heated trickle purge of inert gas (e.g., nitrogen) to the gasifier during depressurization and/or pressurization, in order to maintain an elevated temperature of the gasifier after gasifier shutdown. The system may include a controller (e.g., an industrial controller equipped with memory and one or more processors) for controlling operation of different valves (e.g., flare valve, valves for opening purge flow lines, bypass line valve, etc.) based at least on feedback from a pressure sensor monitoring the pressure of the gasification system.

Turning now to the drawings, FIG. 1 is a diagram of an embodiment of an integrated gasification combined cycle (IGCC) system 100 that may produce and burn a synthetic gas, i.e., syngas. As discussed in detail below, the IGCC system 100 may include multiple lines for venting gases (during depressurization) and/or introducing purge flows of inert gas (during pressurization) to remove residual gases from the system. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or pelletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700° C. to 1600° C., depending on the type of gasifier 106 utilized. The gasification process may include the feedstock undergoing a pyrolysis process, whereby the feedstock is heated. Temperatures inside the gasifier 106 may range from approximately 150° C. to 700° C. during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700° C. to 1600° C. Next, steam may be introduced into the gasifier 106 during a gasification step. The char may react with the carbon dioxide and steam to produce carbon monoxide and hydrogen at temperatures ranging from approximately 800° C. to 1100° C. In essence, the gasifier 106 utilizes steam and oxygen to allow some of the feedstock to be "burned" to produce carbon monoxide and release energy, which drives a second reaction that converts further feedstock to hydrogen and additional carbon dioxide.

In this way, a resultant gas is manufactured by the gasifier 106. This resultant gas may include approximately 85% of carbon monoxide and hydrogen in equal proportions, as well as $CH_4$, HCl, HF, COS, $NH_3$, HCN, and $H_2S$ (based on the sulfur content of the feedstock). This resultant gas may be termed dirty syngas, since it contains, for example, $H_2S$ or other acid gases. The gasifier 106 may also generate waste, such as slag 108, which may be a wet ash material. This slag 108 may be removed from the gasifier 106 and disposed of, for example, as road base or as another building material. To clean the dirty syngas, a gas purifier 110 may be utilized. In one embodiment, the gas purifier 110 may be a water gas shift reactor. The gas purifier 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, the gas purifier 110 may separate salts 113 from the dirty syngas via a water treatment unit 114 that may utilize water purification techniques to generate usable salts 113 from the dirty syngas. Subsequently, the gas from the gas purifier 110 may include clean syngas, (e.g., the sulfur 111 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the clean syngas. However, removal of residual gas components from the clean syngas is optional, since the clean syngas may be utilized as a fuel even when containing the residual gas components, e.g., tail gas. The clean syngas, which has undergone the removal of its sulfur containing components, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques.

The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within the combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to a first load 134, which may be a stationary load, such as an electrical generator for producing electrical power, for example, in a power plant. Indeed, the first load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. In some embodiments, for example, the steam may be supplied to a heat exchanger for heating a flow of inert purge gas supplied to the IGCC system 100. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

At certain times throughout operation of the IGCC system 100, the gasifier 106 may be temporarily shut down. For example, the gasifier 106 may be shut down to allow an operator to provide maintenance or replacement of components within the gasifier 106 (e.g., burner) or other IGCC system equipment. In the following discussion, any mention of "shutting down the gasifier" or "gasifier shutdown" simply refers to stopping the reaction in the gasifier 106, e.g., by terminating the flow of feedstock, oxygen, and/or steam into the gasifier 106. After this gasifier shutdown, portions of the IGCC system (or gasification system) 100 may be purged of residual gases to remove any remaining contaminants (e.g., sulfur). This generally involves one or more cycles of depressurization of the gasification system 100 and pressurization of the gasification system 100. Depressurization involves venting gases from the gasification system 100, and pressurization involves providing an inert, or noncombustible, gas (e.g., nitrogen) to the gasification system 100. In present embodiments, multiple flow lines are present throughout the gasification system 100 to supply the inert gas to different sections of the gasification system 100, thereby pressurizing the system. For example, in the illustrated embodiment, flow lines 144 and 146 may be used convey nitrogen from the ASU 122 to the gasifier 106 and the gas purifier 110, respectively, to provide a multi-stage purge of the gasification system 100 after gasifier shutdown. By using multiple flow paths to facilitate the flow of residual gases out of the gasification system 100, residual gases may be removed in a shorter amount of time than would be possible otherwise.

Present embodiments of the gasification system 100 also may include a controller 148 configured to control operation of valves and other system components within the gasification system 100 based on sensor feedback. The controller 148 may include a memory 150 and a processor 152. The memory 150 is configured to store machine-readable instructions that may be executed by the processor 152. These instructions may include various monitoring and control functions performed between the controller 148 and the gasification system 100. In the illustrated embodiment, for example, the controller 148 is configured to monitor and/or control components of the gasifier 106 and the gas purifier 110.

Figure 2:
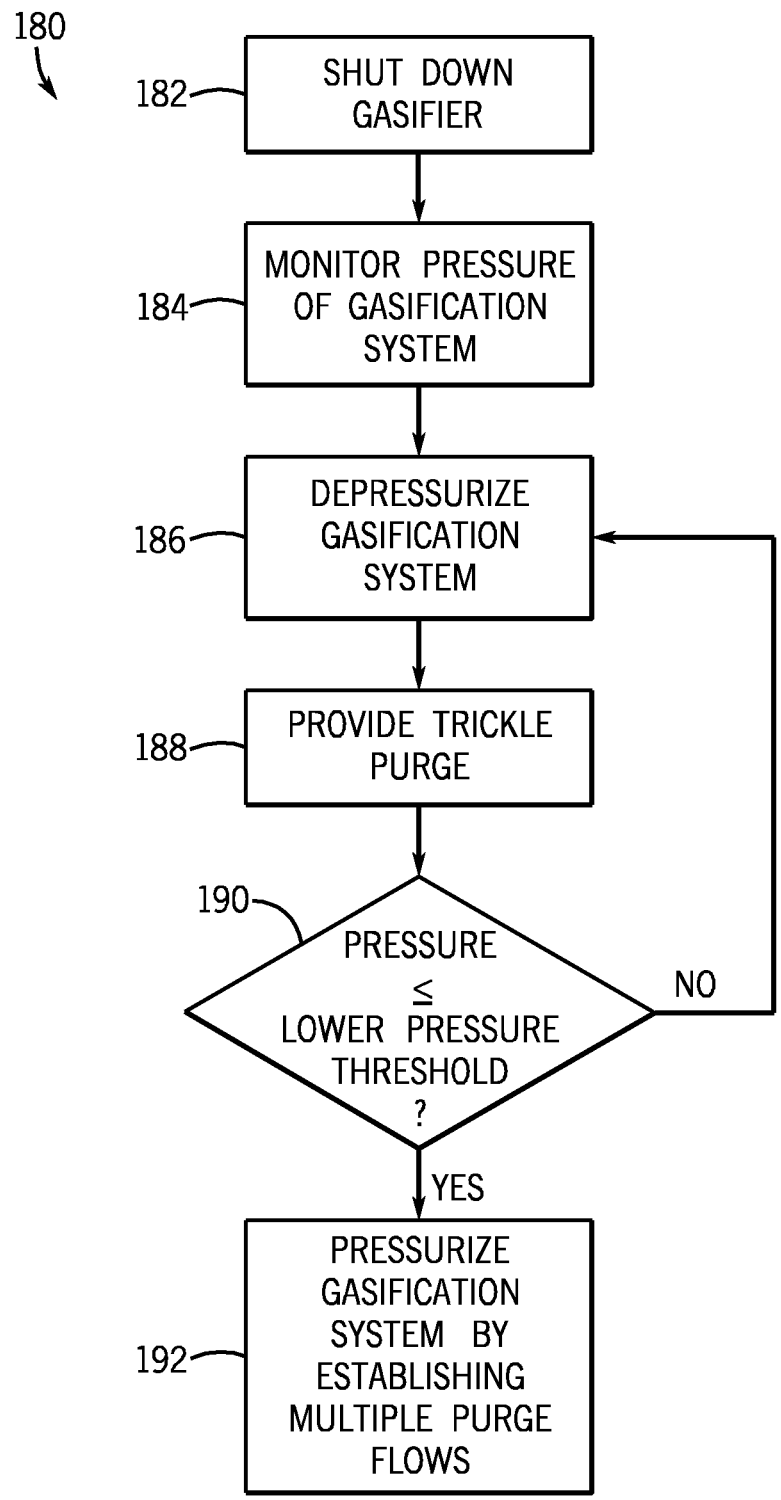
FIG. 2 is a process flow diagram of an embodiment of a method for removing residual gases from a gasification system after gasifier shutdown.

FIG. 2 is a process flow diagram of an embodiment of a method 180 for removing residual gases from the gasification system 100 after gasifier shutdown. It should be noted that the method 180 may be implemented as a computer or software program (e.g., code or instructions) that may be executed by the processor 152 to execute one or more of the steps of the method 180. Additionally, the program (e.g., code or instructions) may be stored in any suitable article of manufacture that includes at least one tangible non-transitory, computer-readable medium that at least collectively stores these instructions or routines, such as the memory 150 or another storage component of the controller 148. The term non-transitory indicates that the medium is not a signal.

In the illustrated embodiment, the method 180 includes shutting down (block 182) the gasifier. As previously mentioned, this may entail stopping the flow of one or more of a feedstock, oxygen, or steam to the gasifier 106, thereby stopping the reaction in the gasifier 106. That is, gasifier shutdown stops the gasification reaction before the depressurization of the gasification system 100 takes place. The other blocks in the method 180 may form a procedure for operating the gasification system 100 after gasifier shutdown. This procedure may quickly remove residual gases from components of the gasification system 100.

The method 180 also includes monitoring (block 184) a pressure (e.g., via a pressure sensor) of the gasification system 100 after gasifier shutdown. In addition, the method 180 includes depressurizing (block 186) the gasification system 100 after gasifier shutdown. This may be accomplished by opening a flare valve to release gas from the gasifier 106 and the gas purifier 110 to an atmosphere, a storage tank, or another location. Residual gas (e.g., pollutants and combustible concentrations leftover from the gasification process) may exit the gasification system 100 by making its way through the gas purifier 110 and out through the downstream flare. The gases may pass through a gas treatment system of the gas purifier 110 for cleaning before removal to an ambient atmosphere. During depressurization, a bypass line may be opened to convey at least a portion of residual gas from the gasifier 106 to a downstream portion of the gas purifier 110. This enables the residual gas to exit the gasification system 100 without passing through every component of the gas purifier 110, thereby accelerating depressurization of the gasification system 100.

The method 180 may include providing (block 188) a trickle purge flow of inert gas (e.g., nitrogen) into the gasification system 100 after gasifier shutdown. The trickle purge is established upstream of or at the gasifier 106 (e.g., via a fuel injector or a separate purge port) to provide a steady flow of inert gas from the gasifier 106 through the gasification system 100 and toward the open flare. The trickle purge may reduce a backflow of contaminated gas to components of the gasification system 100 located upstream of the gasifier 106. In some embodiments, the trickle purge may be heated, so that cooling of the gasifier 106 occurs more slowly after gasifier shutdown. In other words, the heated trickle purge may have a temperature and flow rate suitable to maintain a temperature of the gasifier above a threshold temperature for at least some duration of time, thereby enabling a hot restart of the gasification system 100 after completion of service, inspection, or repairs. It should be noted that the trickle purge may be provided to the gasification system 100 at any point during the process after gasifier shutdown, e.g., before, during, or after depressurization of the gasification system 100.

Further, the method 180 includes determining whether the monitored pressure of the gasification system 100 is less than or equal to a lower pressure threshold, as indicated in block 190. This lower pressure threshold may be predetermined based on amount of sulfur removal desired when the system is fully depressurized. Any remaining sulfur may be removed through pressurization of the gasification system 100. In addition, the pressure threshold may be predetermined so that it is close to (but above) the lowest pressure in which gas can be sent through the gas purifier 110. Depending on the particular system and the desired sulfur removal, the lower pressure threshold may be approximately 150 kPa, 300 kPa, 350 kPa, 400 kPa, 700 kPa, or any other predetermined amount. Depressurization of the gasification system 100 continues as long as the monitored pressure remains above the lower pressure threshold. When the monitored pressure reaches the lower pressure threshold, the method 180 includes pressurizing (block 192) the gasification system 100 after gasifier shutdown. As discussed in detail below, this pressurization may involve establishing multiple purge flows of inert gas into the gasification system 100 to remove residual gas therefrom. In this way, the gasification system 100 completes a depressurization/pressurization cycle. Although the illustrated method 180 includes only one such cycle, other embodiments may include the gasification system 100 cycling through these steps multiple times.

Figure 3:
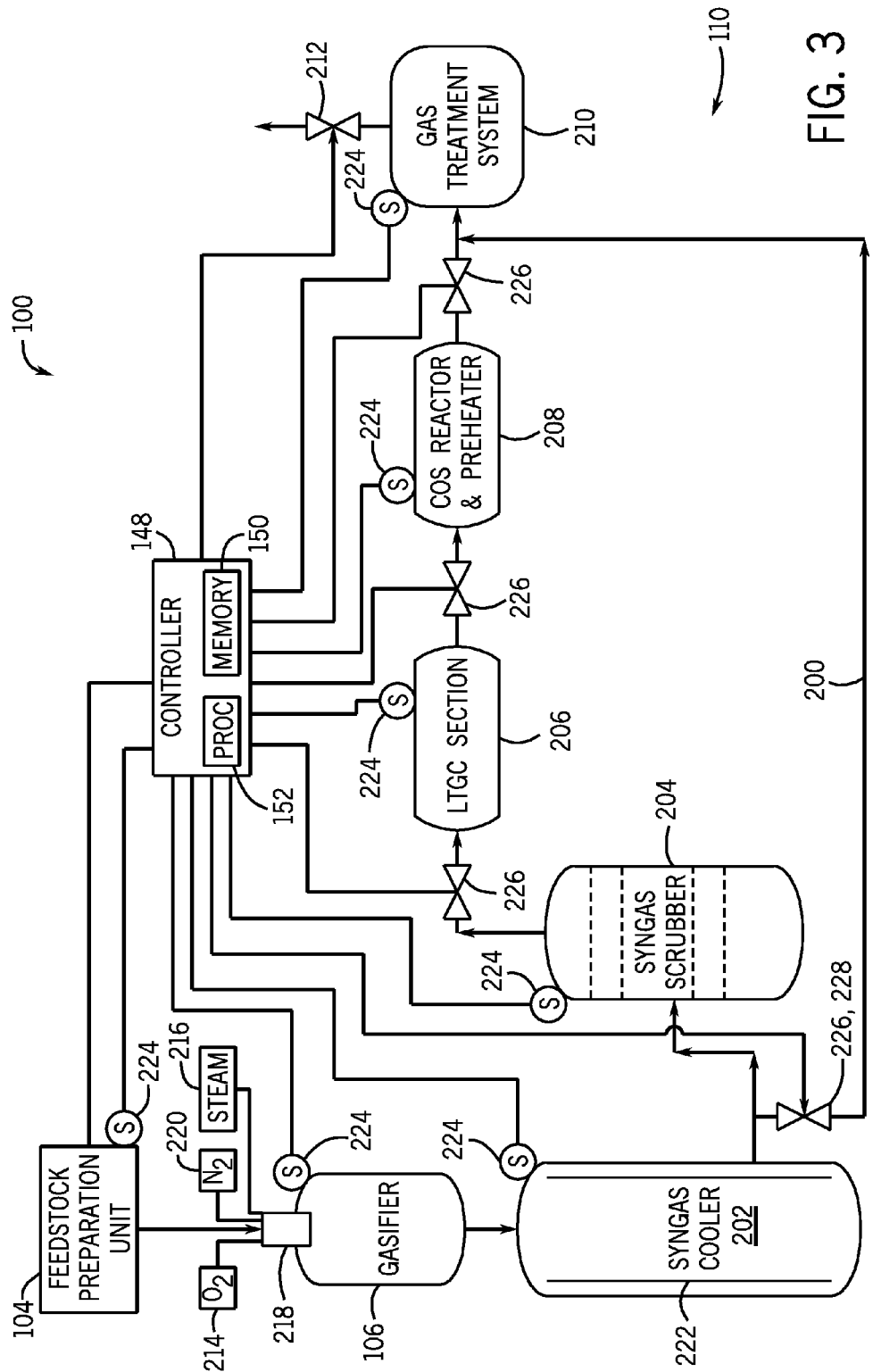
FIG. 3 is a block diagram of an embodiment of a gasification system having a bypass line for accelerating depressurization of the gasification system.

FIG. 3 is a block diagram of an embodiment of the gasification system 100 having a bypass line 200 for accelerating depressurization of the gasification system 100. As illustrated, the gasification system 100 may include, among other things, the gasifier 106, a syngas cooler 202 (e.g., a radiant syngas cooler (RSC) or a quench cooler), a syngas scrubber 204, a low temperature gas cooling (LTGC) section 206, a COS (carbonyl sulfide) reactor and preheater 208, and a gas treatment system 210. In addition, the gasification system 100 may include a flare valve 212 for releasing gas from the gasification system 100. One or more of such flare valves 212 may be located throughout the gasification system 100.

As previously discussed, the gasifier 106 reacts a feedstock provided by the feedstock preparation unit 104 with oxygen 214 (e.g., from ASU 122) and steam 216 (e.g., from HRSG 138). The feedstock, oxygen 214, and steam 216 are introduced to the gasifier 106 through a fuel injector 218. The flows of each of these components into the gasifier 106 may be controlled by the controller 148. For example, the controller 148 may close valves supplying these different flows based on a signal to shut down the gasifier. After gasifier shutdown, the fuel injector 218 (or a separate port) may direct a trickle purge flow of inert gas (e.g., nitrogen 220 from ASU 122) into the gasifier 106 for purging a reaction chamber of the gasifier 106 of residual gases (e.g., syngas).

The syngas cooler 202 shown in FIG. 3 may represent a radiant syngas cooler (RSC) of the gasification system 100, a quench cooler, or any other type of syngas cooler that is not the LTGC 206. For purposes of discussion, the cooler 202 is described as an RSC below. The RSC 202 cools the chemicals generated through the gasification process to separate the dirty syngas from other byproducts (e.g., slag). The RSC 202 may include an annulus 222 where a purge gas may be introduced to the gasification system 100, as described in detail below.

The syngas scrubber 204, LTGC 206, COS reactor and preheater 208, and gas treatment system 210 may together form the gas purifier 110 introduced in FIG. 1. The syngas scrubber 204 scrubs the dirty syngas to remove remaining entrained solids and ammonia from the syngas. The LTGC 206 may include multiple heat exchangers and knockout vessels used to provide additional cooling to the syngas flowing through the gasification system 100. The COS reactor and preheater 208 includes a hydrolysis reactor for COS removal and a carbon bed for mercury removal. Although shown as separate components, certain embodiments may include the COS reactor and preheater 208 as part of the LTGC 206. The gas treatment system 210 represents any relatively downstream component of the gas purifier 110 configured to receive and treat syngas generated by the gasifier 106. For example, the gas treatment system 210 may include the sulfur processor 112 of FIG. 1, which uses an acid gas removal (AGR) unit to absorb acid gases (e.g., sulfur) from the syngas. The gas treatment system 210 also may include a carbon capture system to remove, purify, and store a carbonaceous gas, such as carbon dioxide ($CO_2$). In the illustrated embodiment, the gas treatment system 210 includes the flare valve 212 for releasing the residual gases to the atmosphere after gasifier shutdown. This enables the gas treatment system 210 to appropriately treat the residual gases before releasing the gases through the flare valve 212.

To depressurize the gasification system 100, the flare valve 212 is opened to release the treated residual gas from the gasification system 100 after gasifier shutdown. A pressure difference between the gasification system 100 (higher pressure) and the atmosphere (lower pressure) urges residual gas to flow from the gasifier 106 through the other components of the gasification system 100 and out through the flare valve 212. Present embodiments of the gasification system 100 include multiple flow lines for facilitating a flow of residual gas through the system during depressurization, and later during pressurization. For example, the bypass line 200 may convey a portion of the residual gas from the gasifier 106 to the gas treatment system 210 during depressurization, without passing the portion of the residual gas through the scrubber 204, LTGC 206, and/or COS reactor and preheater 208 located upstream of the gas treatment system 210.

In the illustrated embodiment, the gasification system 100 includes multiple sensors 224 used to monitor various parameters (e.g., temperature, pressure, flow rate, gas composition, or concentration, etc.) of gas flows throughout the gasification system 100. As illustrated, the sensors 224 may be located in the gas treatment system 210, COS reactor and preheater 208, LTGC 206, syngas scrubber 204, RSC 202, or gasifier 106. In some embodiments, the sensors 224 may be located in one or more flow lines between two sections. The controller 148 may process sensor feedback received from the sensors 224 and send control signals to various valves 226 (or actuators) of the gasification system 100 based on the sensor feedback. Because of the locations of the valves 226, the controller 148 is able to control a flow between each section of the gasification system 100. In this way, the controller 148 may govern operation of the gasification system 100 during both gasifier operation and the depressurization/pressurization sequence performed after gasifier shutdown.

At least one of the sensors 224 is a pressure sensor designed to monitor a pressure of the gasification system 100. The controller 148 is able to control, based on the monitored pressure, operation of the flare valve 212 and other valves 226 that open the different flow lines throughout the gasification system 100. These multiple flow lines, again, facilitate a flow of residual gas (e.g., syngas) through the gasification system 100 after gasifier shutdown. One such flow line includes the bypass line 200. The controller 148 is able to open a bypass valve 228 of the bypass line 200 to allow a flow of residual gas out of the gasification system 100. That is, the memory 150 may include machine-readable instructions that, when executed by the processor 152, control operation of the bypass valve 228 to open the bypass line 200 during depressurization. In this way, the residual gas does not have to pass through all of the sections (e.g., syngas scrubber 204, LTGC 206, COS reactor and preheater 208).

The bypass line 200 and bypass valve 228 may be located at other positions within the gasification system 100. For example, the bypass line 200 may extend from any relatively upstream portion of the gasification system 100 (e.g., position between the syngas scrubber 204 and the LTGC 206) to the gas treatment system 210. The more upstream the location of the bypass valve 228 and bypass line 200, the more sections that the residual gases from the gasifier 106 may be routed around during depressurization. This accelerates the depressurization process, as the gas no longer have to flow through every section of the gasification system 100. The bypass line 200 may be sized appropriately based on a desired flow rate of the residual gas. For example, it may be desirable to have a relatively low flow rate of gas so that the amount of residual gas flowing through the bypass line 200 makes up only a certain amount of the residual gas arriving at the gas treatment system 210 during depressurization. In this way, any heat maintained in the gas flow through the bypass line 200 (which does not pass through the LTGC 206) does not damage downstream components of the gas treatment system 210.

Figure 4:
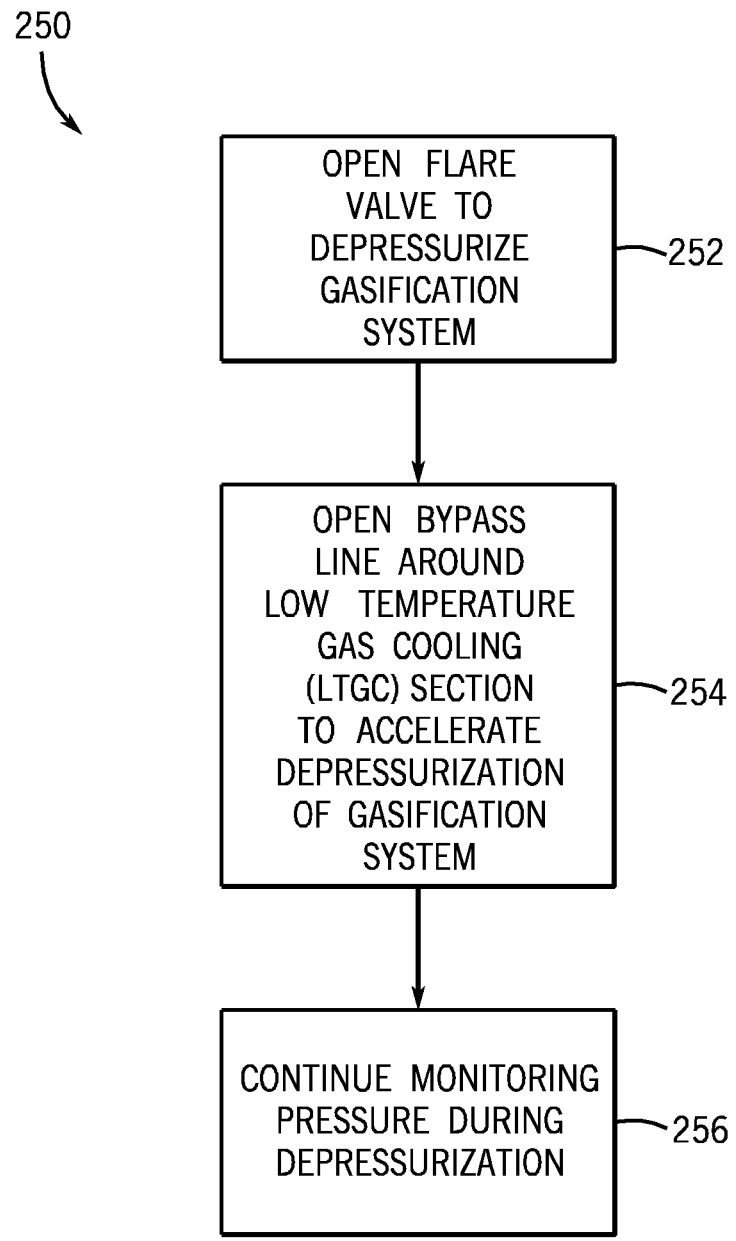
FIG. 4 is a process flow diagram of an embodiment of a method for depressurizing the gasification system of FIG. 3.

FIG. 4 is a process flow diagram of an embodiment of a method 250 for depressurizing the gasification system 100 of FIG. 3. The method 250 represents a possible breakdown of block 186 (i.e., depressurizing the gasification system 100) of the method 180 shown in FIG. 2. The method 250 may be performed through the execution of instructions stored on any suitable machine-readable medium, as described in reference to FIG. 2 above.

The method 250 includes opening (block 252) the flare valve 212 to depressurize the gasification system 100. This opened flare valve 212 creates a pressure difference that urges residual sulfur and other contaminants to flow to the gas treatment system 210 for cleaning, and eventually out of the gasification system 100 via the flare valve 212. Simultaneously, the pressure of the gasification system 100 decreases, approaching the pressure of the outside atmosphere. The method 250 also includes opening (block 254) the bypass line 200 around the LTGC 206 to accelerate the depressurization of the gasification system 100. The bypass line 200 is one of at least two possible routes for the residual gas through the gasification system 100. This increases a total flow rate of residual gas exiting the gasification system 100, thereby accelerating the depressurization process. The method 250 further includes continuing (block 256) to monitor the pressure (via the pressure sensor) during depressurization. Depressurization ends when the monitored pressure of the gasification system 100 reaches the lower pressure threshold.

Figure 5:
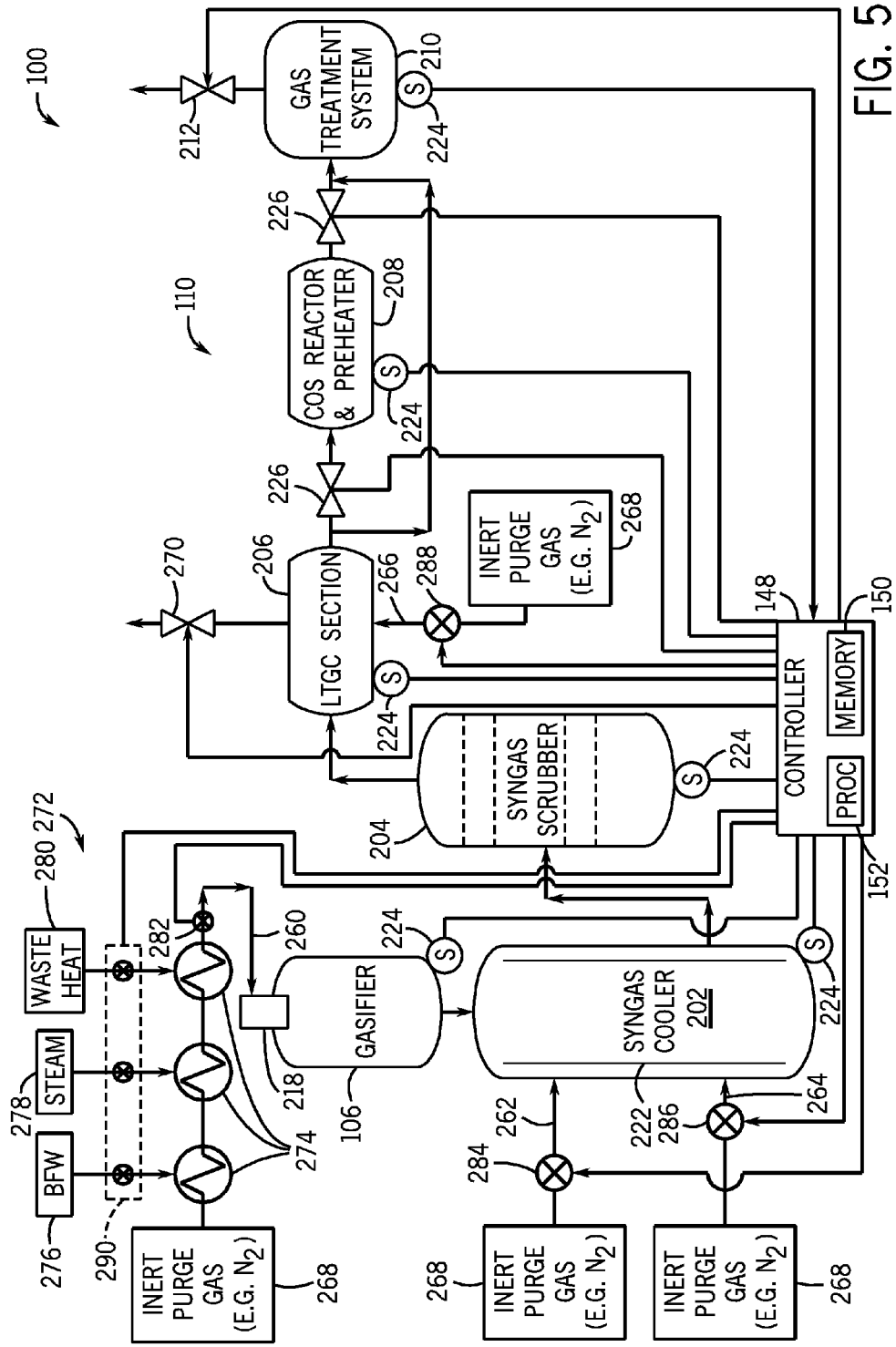
FIG. 5 is a block diagram of an embodiment of a gasification system having multiple flows of inert purge gas for pressurizing the gasification system.

FIG. 5 is a block diagram of an embodiment of the gasification system 100 having additional flow lines used to facilitate a flow of residual gas through the gasification system 100 during pressurization. To increase the pressure of the gasification system 100, multiple flow lines (e.g., 260, 262, 264, and 266) convey flows of an inert purge gas 268 (e.g., nitrogen) into the gasification system 100. These purge gas flows may carry contaminants (e.g., sulfur) to the gas treatment system 210 and exit through the flare valve 212, while driving up the pressure in the gasification system 100. By using multiple purge flows, it is possible to drive up the pressure and remove the residual gas from the gasification system 100 faster than would be possible using a single purge flow.

During pressurization, the flare valve 212 may be maintained in an open position, or it may be partially or fully closed to enable pressurization within the system, depending on the pressure of the purge gas flows that are introduced. For example, in systems where the purge gas flows are introduced at relatively low pressures, it may be desirable to close the flare valve 212 and allow the system to pressurize before opening the flare valve 212 to depressurize the system again. The inert purge gas 268 conveyed through these flow lines 260, 262, 264, and 266 may be nitrogen (e.g., from ASU 122), or any suitable noncombustible gas (e.g., excluding oxygen, combustible fuel, etc.). As illustrated, it may be desirable to provide the same inert purge gas 268 to the gasification system 100 through each of the flow line 260, 262, 264, and 266.

Each of the multiple flow lines 260, 262, 264, and 266 introduces the inert purge gas 268 to a different location of the gasification system 100 relative to each other. In the illustrated embodiment, the inert purge gas 268 is supplied to the gasification system 100 via the first flow line 260 into the gasifier 106, through the second flow line 262 into the annulus 222 of the RSC 202, through the third flow line 264 into the RSC 202, and through the fourth flow line 266 into the LTGC 206. This arrangement is exemplary, however, and the multiple flow lines may be located at any number of positions in the gasification system 100 to establish and maintain a flow of residual gas through the gasification system 100.

Further, each of the multiple flow lines 260, 262, 264, and 266 are established at different times relative to each other. More specifically, a purge flow through a relatively upstream flow line (e.g., 260) may be established prior to a purge flow through a relatively downstream flow line (e.g., 266). As a result, a forward flow of gas introduced into the upstream component may reduce an amount of backflow of gas that is later introduced into the downstream component. Such a multi-stage purge sequence may reduce the amount of time for pressurizing the gasification system 100 due to reducing backflow and encouraging forward flow and removal of residual gas.

In the illustrated embodiment, the first flow line 260 may provide a trickle purge of the inert purge gas 268 into the gasifier 106. This trickle purge may provide just enough positive pressure to keep gas from traveling upstream into the gasifier 106 after gasifier shutdown. Again, the trickle purge may actually be introduced during depressurization, and maintained through pressurization of the gasification system 100. The second flow line 262 may introduce a relatively low pressure purge flow into the annulus 222 of the RSC 202, providing a positive pressure to keep gas from coming up into the annulus 222 when the third flow line 264 introduces a pressurized inert gas flow. The third flow line 264 may establish this first pressurized flow of the inert purge gas 268 to the RSC 202. In this context, the term "pressurized flow" indicates that the purge gas flow is established at a relatively higher pressure than the flows previously established through the flow lines 260 and 262. The pressurized flow may be a flow of the inert purge gas 268 introduced at a pressure above atmospheric pressure, for example, or above approximately 7000 kPa. This pressurized flow moves residual gases from the gasifier 106 through the gasification system 100 and out through the flare valve 212. There may be additional flare valves (e.g., 270) located throughout the gasification system 100 for venting certain gases during pressurization and/or depressurization. In the illustrated embodiment, the fourth flow line 266 introduces a second pressurized flow of the inert purge gas 268 to the gasification system 100, through the LTGC 206. In other embodiments, the flow line 266 may introduce the purge gas at any location downstream of the RSC 202 and upstream of the gas treatment system 210, as long as it is established after the first pressurized flow. Again, the first forward flow of inert gas through the gasification system 100 reduces an amount of backflow of the second flow of inert gas, while increasing the amount of pressure in the gasification system 100.

The flow lines 260, 262, 264, and 266 may be present in the gasification system 100 in combination with the bypass line 200 of FIG. 3. This gasification system 100 enables a gas flow (e.g., of purge gas and/or residual gas) to be established through each of the flow lines 260, 262, 264, 266, and 200, at different times relative to one another after gasifier shutdown, based at least in part on the monitored pressure. That is, the gas flow of residual gases through the bypass line 200 is established prior to the purge flows through the flow lines 260, 262, 264, and 266, which are established during pressurization after the pressure of the gasification system 100 reaches the lower pressure threshold.

Before the trickle purge is provided to the gasifier 106 through the fuel injector 218, the inert purge gas 268 may be heated using a purge gas heating system 272. The purge gas heating system 272 may include one or more heat exchangers 274 for providing additional heating to the inert purge gas 268 before it is sent to the gasifier 106. In effect, heating the purge flow may help maintain an elevated temperature of the gasifier 106 so that the gasifier 106 takes longer to cool down after gasifier shutdown. This may increase the chances of the gasification system 100 performing a hot restart of the gasifier 106, meaning that the gasification reaction can be restarted after shutdown, depressurization, and pressurization using residual heat in the gasifier to ignite a fuel source. The heat exchangers 274 may heat the inert purge gas 268 to a temperature range of approximately 100-500° C., 125-400° C., 140-300° C., or 150-250° C. The heat exchangers 274 may use one or more different heat sources available from the IGCC system 100, such as boiler feed water (BFW 276), steam 278, waste heat 280, exhaust gas, or any other heat source. The heat sources may be generated by any number of different components of the IGCC system 100 as well, including a boiler, HRSG 138, furnace, turbine 130, generator, etc. As in the illustrated embodiment, one or more of the heat exchangers 274 may receive heat from one or more of these different heat sources. Other flows of the inert purge gas 268 (e.g., introduced through flow lines 262, 264, and/or 266) may be heated in a similar manner.

The controller 148 may control operation of multiple valves 282, 284, 286, and 288 for the different flow lines 260, 262, 264, and 266, respectively, in response to sensor feedback. Upon the monitored pressure of the gasification system 100 reaching the lower pressure threshold, the controller 148 controls the valves 282, 284, 286, and 288 to establish the multiple purge flows at different times relative to each other. More specifically, the controller 148 opens the trickle purge valve 282 to provide the trickle purge flow of inert gas through the gasification system 100. In addition, the controller controls the purge flow into the annulus 222 by opening the valve 284. The controller 148 may control operation of a first flow valve 286 to establish the first pressurized flow of inert gas into the RSC 202. The controller 148 also controls operation of the second flow valve 288 to establish the second pressurized flow of inert gas into the LTGC 206, after a time delay. The length of the time delay may be a predetermined amount of time or based on a monitored pressure increase in the gasification system 100. Further, the controller 148 may control heating of the trickle purge flow via one or more of the heat exchangers 274 by adjusting valves 290.

Figure 6:
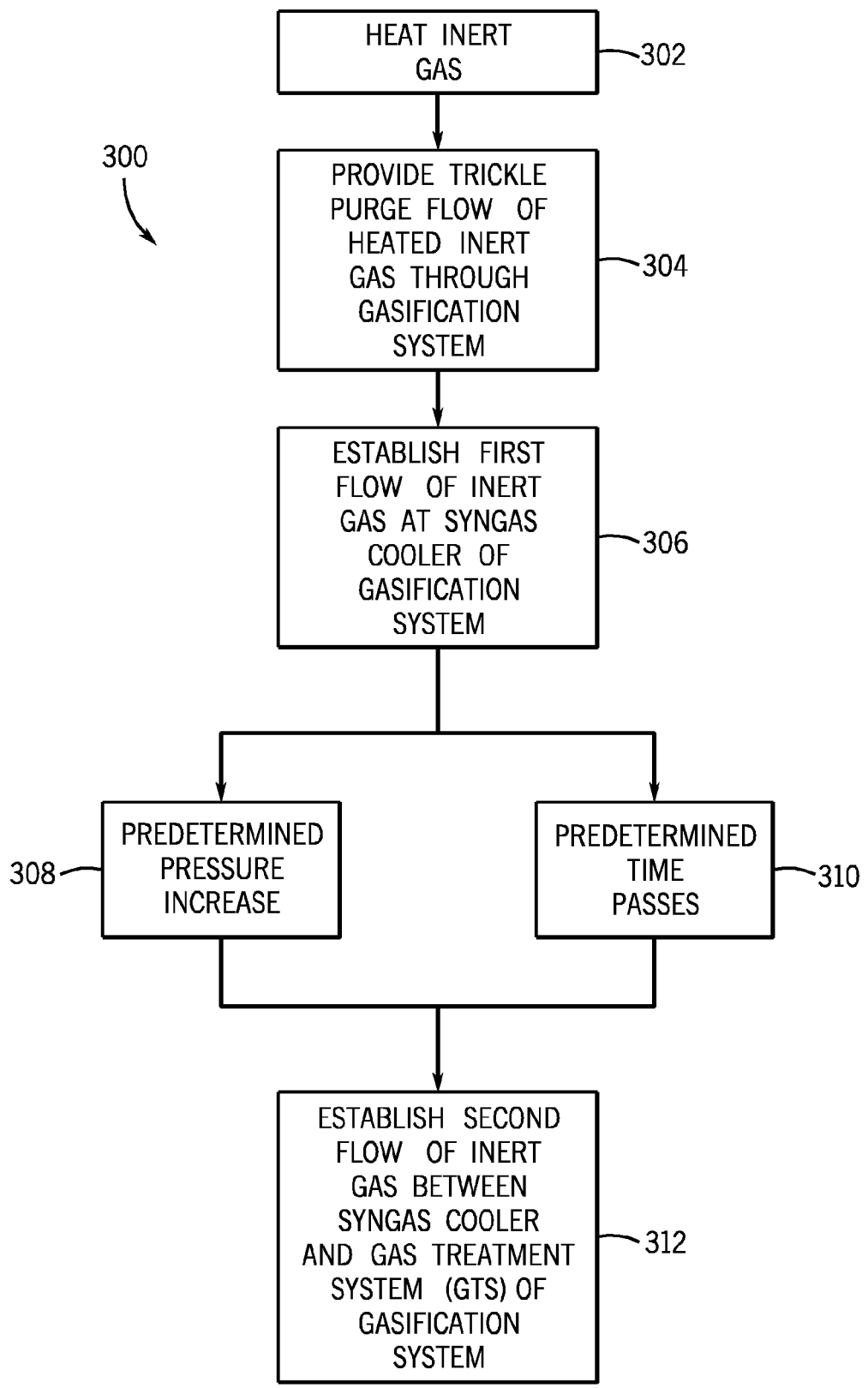
FIG. 6 is a process flow diagram of an embodiment of a method for pressurizing the gasification system of FIG. 5.

FIG. 6 is a process flow diagram of an embodiment of a method 300 for pressurizing the gasification system 100 of FIG. 5. The method 300 represents a possible breakdown of block 192 (i.e., pressurizing the gasification system 100) of the method 180 shown in FIG. 2. The method 250 may be performed through the execution of instructions stored on any suitable machine-readable medium, as described in reference to FIG. 2 above.

The method 300 includes heating (block 302) the inert purge gas 268 for a trickle purge by transferring heat from a heating medium received from another component of the gasification system 100 to the inert purge gas 268 via the heat exchanger 274. The method 300 also includes providing (block 304) the trickle purge flow (e.g., via flow line 260) of heated inert purge gas 268 through the gasification system 100, and establishing (block 306) a first flow (e.g., via flow line 264) of the inert purge gas 268 into a syngas cooler (e.g., RSC 202). Then, after a predetermined pressure increase (block 308) in the gasification system 100, or after a predetermined amount of time passes (block 310), the method 300 includes establishing (block 312) a second flow of the inert purge gas 268. This second flow is introduced between the syngas cooler (e.g., RSC 202) and the gas treatment system 210.

Figure 7:
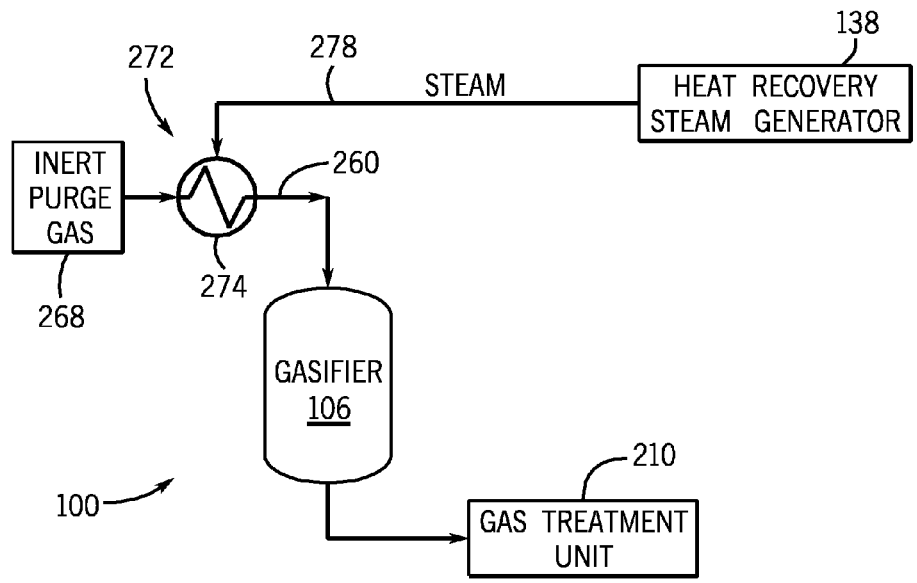
FIG. 7 is a block diagram of an embodiment of a gasification system using steam from a component of the gasification system to heat an inert purge gas.
Figure 8:
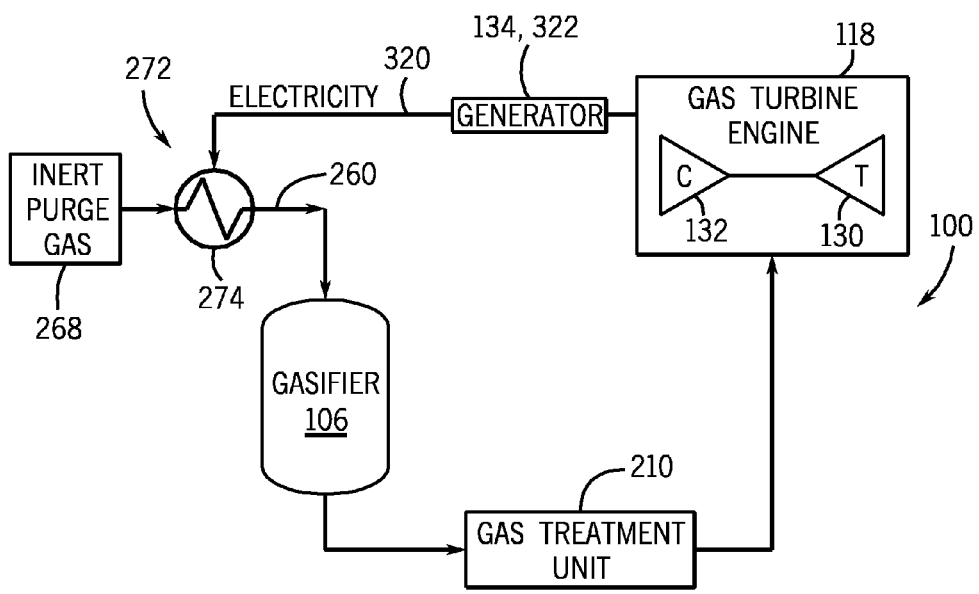
FIG. 8 is a block diagram of an embodiment of a gasification system using electricity generated by a component of the gasification system to heat an inert purge gas.

FIGS. 7 and 8 are block diagrams of embodiments of certain components of the IGCC system 100 that allow for heating of a flow of the inert purge gas 268. In the illustrated embodiments, the inert purge gas 268 is input as a trickle purge flow to the gasifier 106 through flow line 260, as described in detail above. In FIG. 7, steam 278 from the HRSG 138 is input to the heat exchanger 274, which facilitates the transfer of heat from the steam 278 to the inert purge gas 268. In FIG. 8, electricity 320 output from a generator 322 is used to provide energy for heating the inert purge gas 268. The generator 322 may be one or more of the loads 134 and 140 on the gas turbine engine 118 and the steam turbine engine 136.

Figure 9:
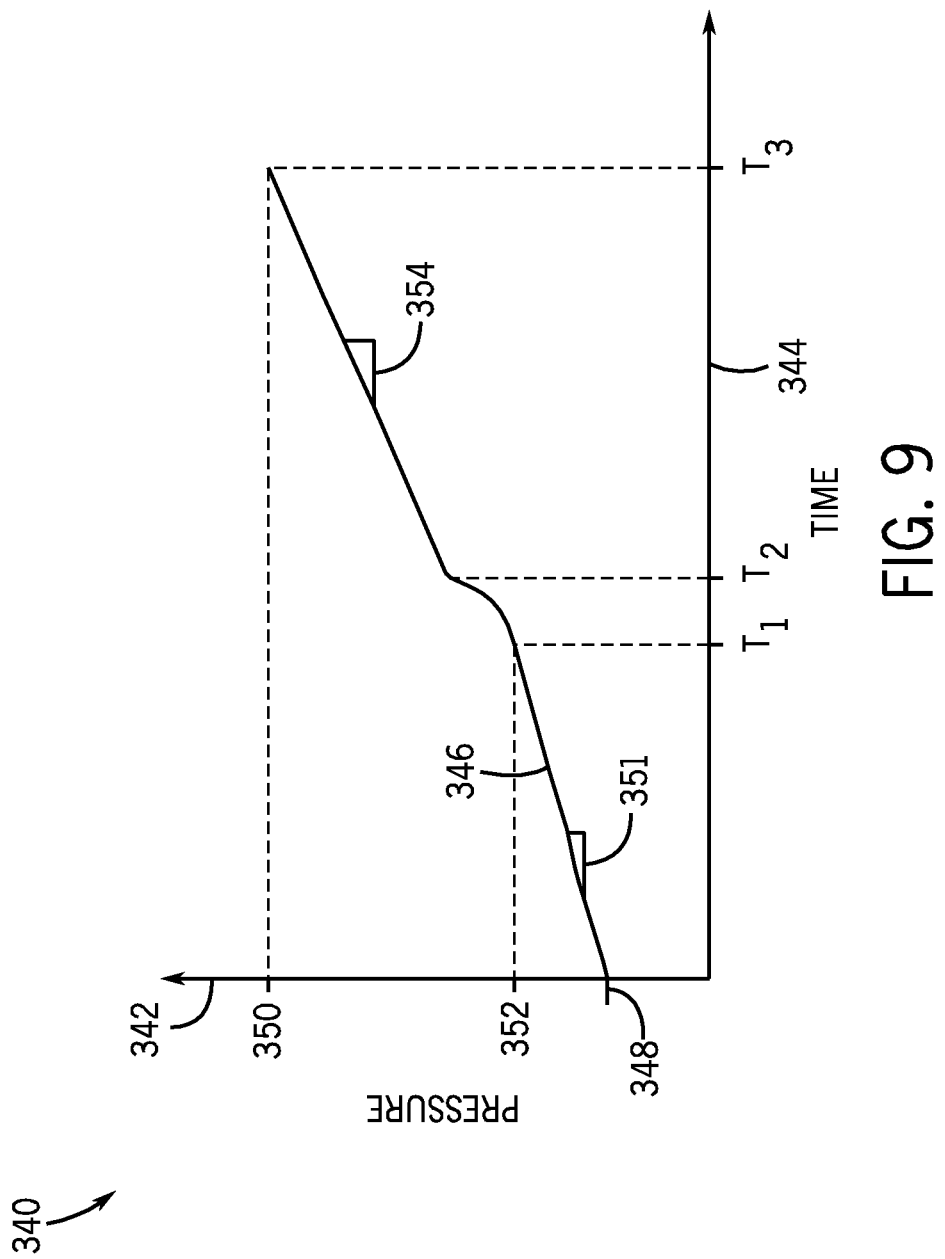
FIG. 9 is a plot modeling an embodiment of a pressure of the gasification system of FIG. 5 with respect to time during pressurization of the gasification system.

FIG. 9 is a plot 340 modeling an embodiment of a pressure of the gasification system 100 with respect to time during pressurization of the gasification system 100. The plot 340 illustrates gasification system pressure (ordinate 342) against time (abscissa 344) during pressurization of the gasification system 100 after gasifier shutdown. A trace 346 indicates a pressure increase, as monitored by a pressure sensor in the gasification system 100 from a lower pressure threshold 348 to an upper pressure threshold 350. These pressure thresholds 348 and 350 may be determined based on a desired amount of residual gases to be removed from the gasification system 100 during pressurization. The trace 346 shows a multi-stage pressurization of the gasification system 100, as described above, through the introduction of two pressurized inert purge gas flows. The first flow is introduced when the pressure is at the lower pressure threshold 348. The trace 346 has a relatively uniform slope 351 until time T1. This time T1 is the time at which the second flow of inert purge gas is introduced to the gasification system 100. T1 may be a predetermined amount of time for the particular system, e.g., as programmed into the controller 148. In some embodiments, T1 may be the time when the monitored pressure of the gasification system 100 reaches a predetermined threshold (e.g., 352) after the first flow is established. The trace 346 illustrates the pressure ramping up slightly from T1 to T2. This may be partially due to the first flow of inert purge gas 268 pushing against an initial backflow of the second flow. From T2 to T3, the pressure increase stabilizes once again, as shown by the relatively constant slope 354 of the trace 346. The constant slopes 351 and 354 indicate the purge flows being established in the gasification system 100 at constant flow rates. In other embodiments, however, the flow rates may be non-linear, as indicated by ramp-up curves. The slope 354 from T2 to T3 may be greater than the slope 351 from T1 to T2 because of the increased flow of purge gas through the gasification system 100 after the introduction of the second flow. This allows the pressure of the system to reach the upper pressure threshold 350 in less time (i.e., T3) than would be possible if only the first purge flow were established.

Technical effects of the invention include, among other things, the ability to remove residual gases from the gasification system in a reduced amount of time after gasifier shutdown. The bypass line may allow the system to depressurize faster since a portion of the residual gas does not have to travel through all of the intermediary equipment (e.g., syngas scrubber, LTGC, COS reactor and preheater). The multiple flow lines used to introduce purge gas at different times relative to each other allow faster pressurization of the system due to the increased flow rate of purge gas through the system. Introducing downstream purge gas flows after introducing upstream purge gas flows reduces backflow of the downstream purge gas flow, thereby decreasing the amount of time it takes the system to reach a desired upper pressure threshold. By reducing the timeline for depressurization and pressurization of the gasification system in this manner, it is possible to purge the residual gas from the system faster. This reduces the amount of cooling in the gasifier after gasifier shutdown. In addition, a heated trickle purge provided to the gasifier may keep the gasifier temperature elevated throughout the removal of the residual gas. This may ultimately allow the system to perform a hot restart of the gasifier after completely purging the gasification system of contaminants.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
   monitoring a pressure of a gasification system after gasifier shutdown via a pressure sensor, wherein the gasification system comprises a gas treatment system and a gasifier configured to output syngas to the gas treatment system during gasification;
   depressurizing the gasification system after gasifier shutdown by opening a flare valve to release gas from the gasifier and the gas treatment system to an atmosphere; and
   pressurizing the gasification system after gasifier shutdown, when the monitored pressure reaches a lower pressure threshold, by establishing multiple purge flows of inert gas into the gasification system to remove residual gas from the gasification system;
   wherein the multiple purge flows are established at different times and at different locations within the gasification system relative to each other,
   wherein establishing multiple purge flows comprises:
   establishing a first flow of the inert gas at a syngas cooler of the gasification system; and establishing a second flow of the inert gas at a location between the syngas cooler and the gas treatment system.

2. The method of claim 1, comprising shutting down the gasifier to stop the gasification before depressurizing the gasification system.

3. The method of claim 1, wherein depressurizing the gasification system comprises opening a bypass line configured to convey at least a portion of the gas from the gasifier to the gas treatment system without routing the portion of the residual gas through a low-temperature gas cooling section located upstream of the gas treatment system.

4. The method of claim 1, comprising providing a trickle purge flow of inert gas into the gasification system after gasifier shutdown, wherein the trickle purge is established upstream of or at the gasifier.

5. The method of claim 4, comprising heating the inert gas via a heat exchanger before introducing the trickle purge flow to the gasification system.

6. The method of claim 5, comprising transferring heat from a heating medium received from another component of the gasification system to the inert gas via the heat exchanger.

7. The method of claim 1, wherein the second flow is established a predetermined amount of time after the first flow is established.

8. The method of claim 1, wherein the second flow is established when the monitored pressure reaches a predetermined threshold after the first flow is established.

9. A gasification system, comprising:
a gasifier configured to generate a syngas during gasification;
a gas treatment system configured to receive the generated syngas from the gasifier for treating the syngas during gasification;
a pressure sensor configured to monitor a pressure of the gasification system;
a flare valve configured to release residual gases from the gasification system to the atmosphere when it is opened to depressurize the gasification system after gasifier shutdown; and
multiple flow lines configured to facilitate a flow of the residual gases through the gasification system as the gasification system is depressurized and subsequently pressurized after gasifier shutdown;
wherein a gas flow is established through each of the multiple flow lines at different times relative to one another after gasifier shutdown, based at least in part on the monitored pressure,
wherein the multiple flow lines comprise:
a first flow line configured to provide a first flow of inert gas to the gasifier for pressurizing the gasification system after gasifier shutdown; and
a second flow line configured to provide another flow of inert gas to the gasification system at a location downstream of the gasifier and upstream of the gas treatment system at a time after the first flow is established.

10. The gasification system of claim 9, comprising a controller configured to receive signals from the pressure sensor and to control, based on the monitored pressure, operation of the flare valve and valves configured to open the multiple flow lines for facilitating the flow of the residual gases through the gasification system.

11. The gasification system of claim 9, wherein one of the multiple flow lines comprises a bypass line configured to convey a portion of the residual gas from the gasifier to the gas treatment system during depressurization, without passing the portion of the residual gas through a low temperature gas cooling section of the gasification system located upstream of the gas treatment system.

12. The gasification system of claim 9, wherein one of the multiple flow lines comprises a trickle purge line configured to direct a trickle purge flow of inert gas to the gasifier.

13. The gasification system of claim 12, comprising a heat exchanger configured to transfer heat from a heating medium supplied by another component of the gasification system to the trickle purge flow of inert gas before it enters the gasifier.

14. A tangible, non-transitory, computer-readable medium comprising machine-readable instructions programmed to:
obtain data relating to a pressure of a gasification system from a pressure sensor of the gasification system; and
control operation of a flare valve to reduce the pressure of the gasification system when opened and to allow residual gases to flow out of the gasification system after gasifier shutdown;
control operation of two or more valves to provide separate flows of inert gas into the gasification system after gasifier shutdown to increase the pressure of the gasification system upon the pressure of the gasification system reaching a lower pressure threshold, such that the separate flows are established at different times relative to each other;
control operation of a first flow valve to establish a first flow of inert gas into a syngas cooler of the gasification system; and
control operation of a second flow valve to establish a second flow of inert gas into a portion of the gasification system between the syngas cooler and a gas treatment system at a time delay after the first flow of inert gas is established.

15. The tangible, non-transitory, computer-readable medium of claim 14, comprising machine-readable instructions to:
control operation of a trickle purge flow valve to provide a trickle purge flow of inert gas through the gasification system after gasifier shutdown; and
control heating of the trickle purge flow of inert gas via a heat exchanger before the trickle purge flow of inert gas is introduced to the gasification system.

16. The tangible, non-transitory, computer-readable medium of claim 14, comprising machine-readable instructions to:
control operation of a bypass line valve to open a bypass line between an upstream portion of the gasification system and a gas treatment system during depressurization of the gasification system to route a portion of the residual gases to flow out of the gasification system without flowing through every component of the gasification system.

17. The tangible, non-transitory, computer-readable medium of claim 14, comprising machine-readable instructions to:
control operation of the second flow valve to establish the second flow of inert gas when the pressure of the gasification system reaches a desired pressure threshold after the first flow of inert gas is established.

* * * * *